Aug. 9, 1927.   C. L. BEST   1,638,140
TRACKLAYING TRACTOR
Filed Dec. 9, 1922   4 Sheets-Sheet 2
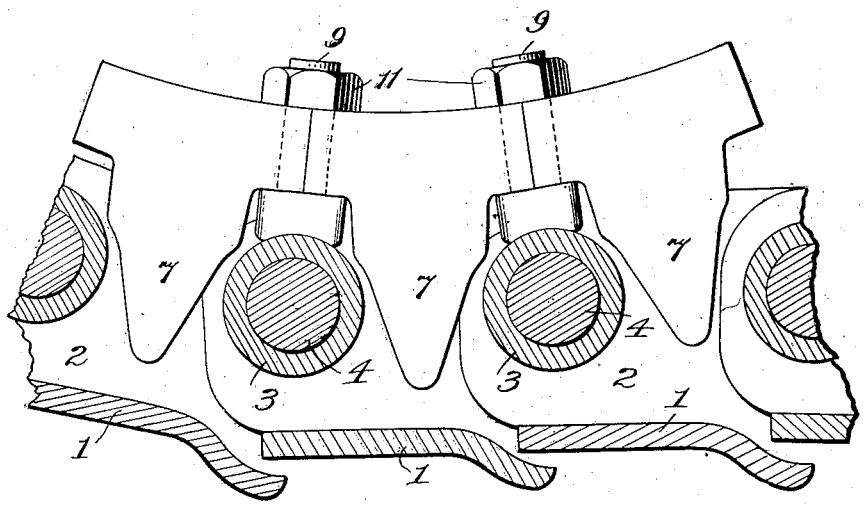
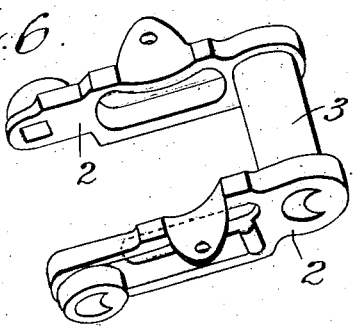

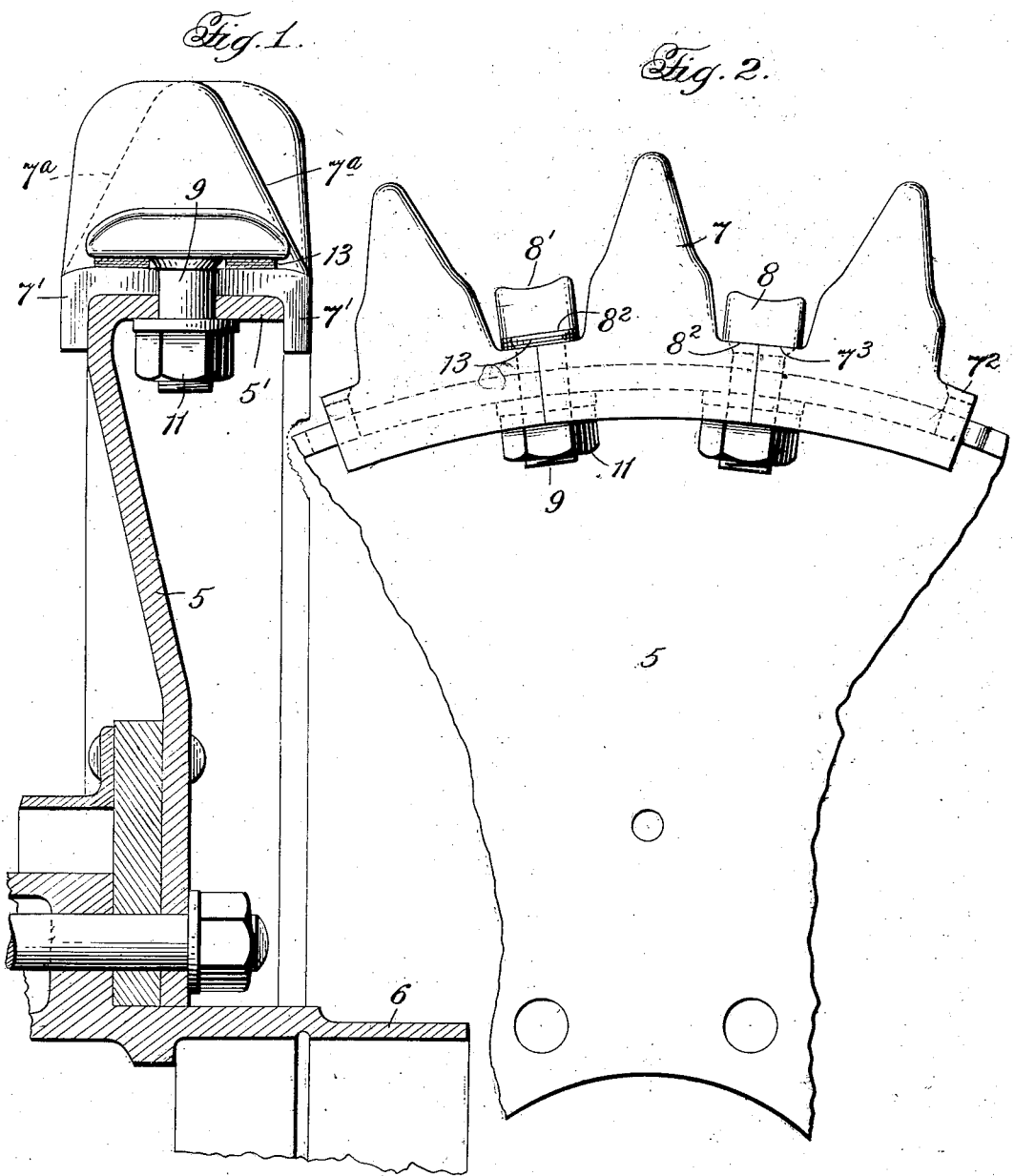

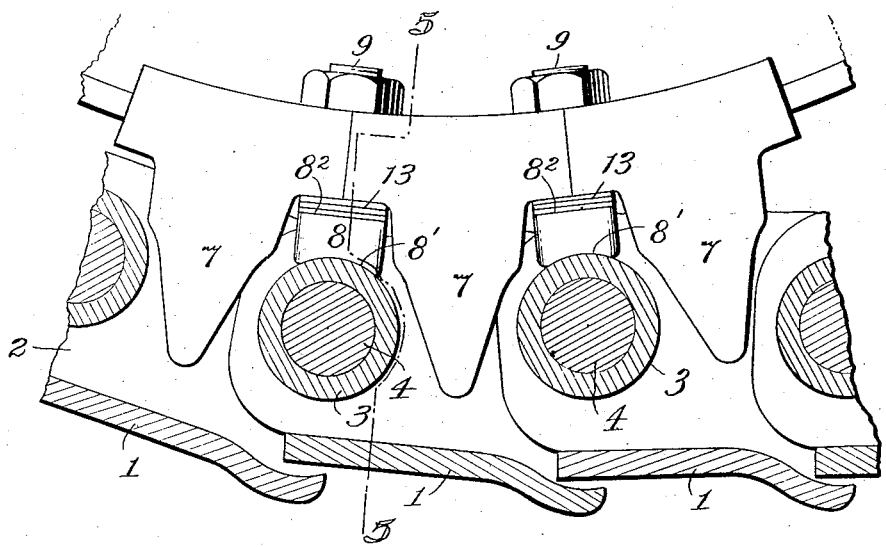
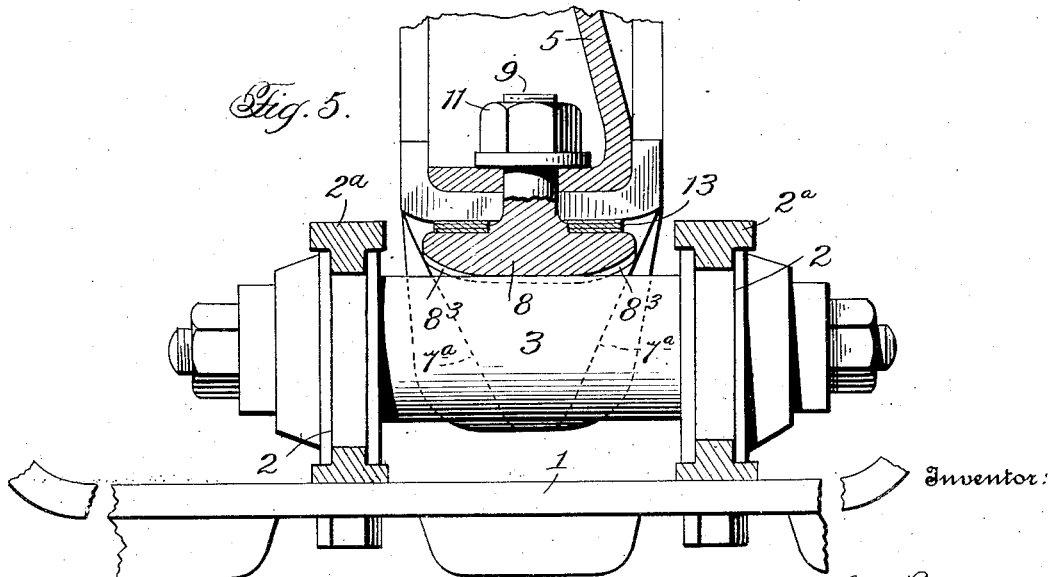

Aug. 9, 1927.
C. L. BEST
1,638,140
TRACKLAYING TRACTOR
Filed Dec. 9, 1922
4 Sheets-Sheet 4
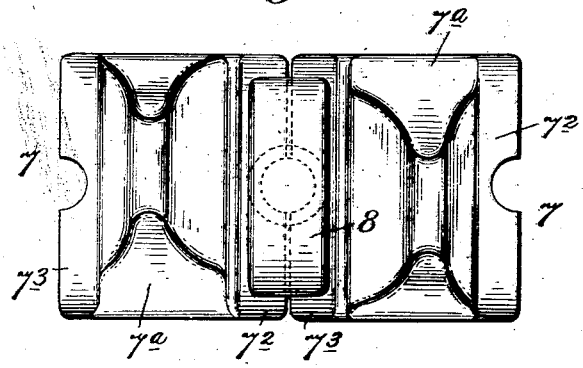
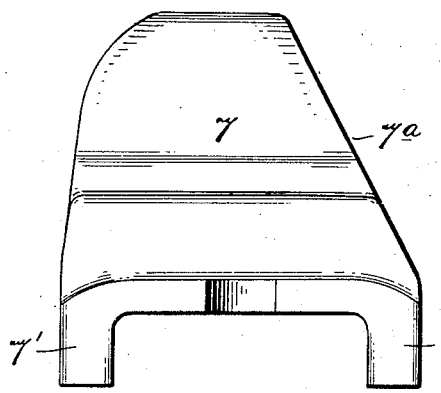
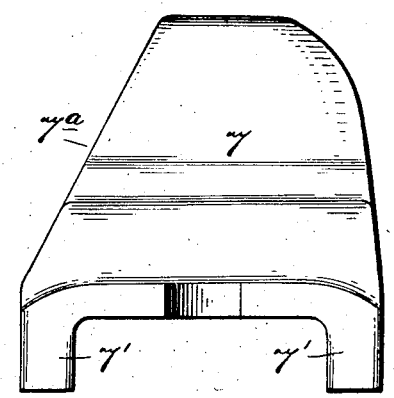
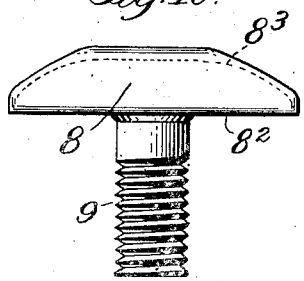
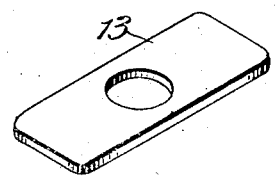
Inventor:
Clarence Leo Best,
By Milans & Milans, Attorneys.
Witness:
Jas. L. Hutchinson.

Patented Aug. 9, 1927.

1,638,140

UNITED STATES PATENT OFFICE.

CLARENCE LEO BEST, OF SAN LEANDRO, CALIFORNIA, ASSIGNOR, BY MESNE ASSIGN-
MENTS, TO CATERPILLAR TRACTOR CO., OF SAN LEANDRO, CALIFORNIA, A COR-
PORATION OF CALIFORNIA.

TRACKLAYING TRACTOR.

Application filed December 9, 1922. Serial No. 605,915.

This invention relates to improvements in track laying tractors, and more particularly to an improved sprocket wheel for the link tracks or treads thereof.

In the use of such machines, wear in the track joints makes the pitch of the tread too large for the sprocket, and operating under these conditions wears out the sprocket on the back portions or rear sides thereof opposite the driving faces. One object of the present invention is to provide an improved sprocket wheel in which provision is made for the ready adjustment of parts of the sprockets thereof to compensate for the wear and enlargement of the tracks, and also for wear of the sprockets whereby the difficulties in operation resulting from the enlargement of the track or wear of the sprockets are avoided and the serviceability of the link treads and sprockets is materially increased.

Another object of the invention is to provide an improved sprocket wheel having teeth or sprockets and chafing rail portions formed separately from the rest of the wheel structure with improved, simple and efficient means for securing the same in place whereby it is possible to provide teeth and chafing rail portions of better wearing qualities and the said parts can be readily renewed in the case of wear or breakage, and a stronger, more durable, economical construction capable of increased service is obtained.

A further object of the invention is to provide an improved sprocket wheel which will present less surface for the accumulation of dirt, that will act to shed and force dirt therefrom and from the links of the tread, and be self cleaning.

The invention, with other objects and advantages thereof, and the particular construction, combination and arrangement of parts comprising the same, will be understood from the following detail description, when considered in connection with the accompanying drawings, forming part hereof, and illustrating one embodiment of the invention.

In the drawings:

Figure 1 is a transverse section of a wheel constructed in accordance with the present invention, one of the adjustable bottom sprocket portions being shown in side elevation adjusted to outer position to increase the diameter of the wheel.

Fig. 2 is a side elevation of a portion of the wheel illustrated in Figure 1.

Fig. 3 is a side elevation, with parts in section, of a portion of the wheel, the intermediate adjustable bottom sprocket portions being shown in their innermost positions engaging a portion of a tractor tread.

Fig. 4 is a side elevation of a portion of the wheel, the same being shown engaging a portion of a tractor tread the intermediate sprocket portions being shown adjusted to an outer position.

Fig. 5 is a transverse section on the line 5—5 of Figure 4.

Fig. 6 is a detail view of one of the tread links.

Fig. 7 is a top plan view of two adjoining main teeth portions and an intermediate sprocket portion.

Figs. 8 and 9 are detail front elevations of two adjoining main teeth portions.

Fig. 10 is a detail view of one of the intermediate sprocket parts.

Fig. 11 is a detail view of one of the washer plates.

The invention contemplates an improved sprocket wheel provided with sprockets or teeth having parts adapted to be adjusted to increase the diameter of the wheel to compensate for enlargement of the pitch of the link tread, and more particularly adjustable parts between the main teeth portions forming the bottoms of the sprockets and adjustable radially.

The invention further comprehends a wheel provided with sprockets or teeth and chafing rail portions formed separately from and detachably secured to the rim, and a construction of this kind in which the sprockets have adjustable intermediate bottom parts which serve as securing means for the other sprocket parts.

While a specific embodiment of the invention is illustrated in the drawings, it will of course be understood, that minor changes and variations in the particular construction shown and the embodiment of the invention in other forms, as will appeal to those skilled in the art and falling within the scope of the appended claims may be practiced without departing from the spirit of the invention.

In the drawings is shown a portion of one of the well known forms of link treads for track laying tractors, the same being made up of link members pivotally connected together, each link member comprising a tread plate 1, spaced side plates 2 provided with upper track bars 2ª, a sleeve 3 at one end, and a pin or strut 4 at the other end. The link members which have openings at the sides thereof, as shown, are arranged in overlapping relation with the pins or struts 4 engaging the sleeves 3, the latter being adapted to engage between the teeth of the sprocket wheel.

The particular construction of wheel illustrated in the drawings, by way of example, has a pressed steel disk body portion 5, said body part having an integral lateral extension forming the rim 5' of the wheel. 6 designates a conventional form of hub to which the pressed steel disk body is bolted, as shown.

The wheel is provided with sprockets comprising main teeth portions 7 and intermediate bottom parts 8 formed as separate parts and detachably secured to the rim 5'. The main teeth portions 7 each have inwardly extending side flanges 7' which fit over the sides of the rim, said flanges forming chafing rails at each side of the wheel and serving as retaining means. The main teeth portions 7 also have front and rear lateral extensions 7²—7³, the adjacent lateral extensions of adjoining teeth portions 7 abutting against each other.

The intermediate sprocket parts 8 have concaved outer faces 8' corresponding to the general curvature of the adjoining main teeth portions 7, the lower faces 8² of the intermediate parts 8 being shown flat to seat on the flat outer faces of the lateral extensions 7².

The main teeth portions 7 and the intermediate sprocket parts 8 are removably secured to the rim 5' through the medium of threaded studs 9 on the intermediate parts 8, and nuts 11, the intermediate parts 8 overlapping adjoining lateral extensions 7² of the main teeth portions 7, and the studs 9 passing through openings 12 in the said lateral extensions 7² and suitable openings in the rim 5'. Radial adjustment of the intermediate parts 8 is provided for through the medium of a plurality of shim members or sets of washers 13 in combination with the studs 9, said washers being interposed between the intermediate sprocket parts 8 and the lateral extensions 7² of the main teeth portions.

The main teeth portions 7 which are of general V-shape form are provided with inclined or outwardly sloping side faces 7ª to forcibly eject dirt therefrom and from the links of the tread, each of said main teeth portions being preferably, as shown, provided with a single inclined side face, and the construction and arrangement of the teeth being such that the inclined side faces of the main teeth portions are alternately disposed at opposite sides of the wheel. In order to assist in the shedding of dirt from the wheel the intermediate portions 8 are provided with end faces 8³ sloping outwardly toward opposite sides of the wheel.

By the special construction, hereinbefore described, provision is made for the ready adjustment of the sprockets of the wheel to suit the pitch of the link tread. While primarily designed to compensate for wear and enlargement of the pitch of the tread or chain, as will be appreciated, the construction also provides for adjustment of the sprocket parts to compensate for wear thereof as well as wear of the tread, and results in a considerable increase in the serviceability of the parts. The means provided for securing the sprocket parts to the rim is of a simple efficient nature, the separate sprocket parts being readily attached, detached, and changed in the case of breakage, wear, or the substitution or use of different forms of teeth, at the same time the formation of the teeth and chafing rails separate from the rim of the wheel permits of the use of teeth and chafing rail portions of better wearing qualities.

Subject matter disclosed in this application but not claimed herein is claimed in my copending application filed September 7, 1922, Serial No. 586,707 now patent No. 1,607,940.

What I claim is:

1. In a track laying tractor, the combination with a link tread, of a sprocket wheel over which the link tread runs, the sprockets of the wheel having radially adjustable intermediate bottom parts, said intermediate bottom parts having end portions sloping outwardly toward opposite sides of the wheel.

2. In a track laying tractor, the combination with a link tread, of a sprocket wheel over which the link tread runs, said sprocket wheel having a rim portion and sprocket teeth formed separate from and removably secured to the rim, said sprocket teeth having inwardly extending flanges fitting over the sides of the rim and forming chafing rails for the wheel.

3. In a track laying tractor, the combination with a link tread, of a sprocket wheel having sprockets comprising main tooth portions having front and rear basal extensions, and intermediate parts overlying said basal extensions, said intermediate parts forming the bottoms of the sprockets, and securing means including threaded studs on said intermediate parts and nuts on the studs.

4. In a track laying tractor, the combination with a link tread, of a sprocket wheel over which the link tread runs, said wheel having sprockets comprising main tooth portions having front and rear basal extensions, and intermediate parts overlying said extensions, said intermediate parts forming the bottoms of the sprockets, and securing means including threaded fastening members extending from the said intermediate parts, and nuts on the fastening members, in combination with shim members adapted to be interposed between said basal extensions and said intermediate sprocket parts to adjust the latter radially relatively to the main tooth portions.

5. In a track laying tractor, the combination of a link tread, of a sprocket wheel having sprockets comprising main tooth portions having front and rear basal extensions, and intermediate parts overlying said basal extensions, said intermediate parts forming the bottoms of the sprockets, and means for detachably securing the main toothed portions and the intermediate sprocket parts to the rim of the wheel including threaded fastening members extending inwardly from said intermediate sprocket parts.

In testimony whereof I hereunto affix my signature.

CLARENCE LEO BEST.